United States Patent [19]

Pinnavaia et al.

[11] Patent Number: 5,116,587
[45] Date of Patent: * May 26, 1992

[54] LAYERED DOUBLE HYDROXIDE SORBENTS FOR THE REMOVAL OF $SO_x$ FROM FLUE GAS RESULTING FROM COAL COMBUSTION

[75] Inventors: Thomas J. Pinnavaia; Jayantha Amarasekera, both of East Lansing; Christine A. Polansky, Ithaca, all of Mich.

[73] Assignee: Board of Trustees operating Michigan State University, East Lansing, Mich.

[ * ] Notice: The portion of the term of this patent subsequent to May 19, 2009 has been disclaimed.

[21] Appl. No.: 466,984

[22] Filed: Jan. 18, 1990

[51] Int. Cl.⁵ .......................... B01J 8/00; C01B 17/00
[52] U.S. Cl. ..................................... 423/244; 252/190
[58] Field of Search ....................... 423/244 A, 244 R; 252/190

[56] References Cited

U.S. PATENT DOCUMENTS

| | | |
|---|---|---|
| 3,699,037 | 10/1972 | Annooser et al. |
| 3,796,792 | 3/1974 | Miyata |
| 3,835,031 | 9/1974 | Bertolocini et al. |
| 3,879,523 | 4/1975 | Miyata |
| 3,879,525 | 4/1975 | Miyata |
| 4,153,534 | 5/1979 | Vaselos |
| 4,472,532 | 9/1984 | Mooi |
| 4,492,678 | 1/1985 | Yoo |
| 4,774,212 | 9/1988 | Drezdon ............................. 502/62 |
| 4,932,382 | 9/1990 | Van Brockhoven ............... 423/244 |

FOREIGN PATENT DOCUMENTS 0278535  8/1988  European Pat. Off.

OTHER PUBLICATIONS

Komppa, V., "Dry Adsorption Processes for Removal of Sox and NOx in Flue Gases—a review", Paperii Ja Puu, 5, 401–405 (1986).
Kocheffe & Karman in Cand. J. Chem. Eng., 63, 971–977 (1985).
S. L. Suib et al., in Solid State Ionics, 26, 77–86 (1988).
W. T. Reichel in Chemtech., 58–63 (1986).
Reichle in J. Catal. 101, 352–359 (1986).
Neuwmann et al., in, Z. Electrochem, 38, 304–310 (1932).
A. A. Battacharyya et al., in Ind. Eng. Chem. Res. 27, 1356–1360 (1988).

Primary Examiner—Gregory A. Heller
Attorney, Agent, or Firm—Ian C. McLeod

[57] ABSTRACT

Processes for removing noxious oxides from gas streams, particularly from flue gases of coal-burning power plants, using heated layered double hydroxide (LDH) sorbents are described. The sorbent compositions contain metal components, incorporated into the sorbents either by isomorphous replacement of all or part of $M^{II}$ and /or $M^{III}$ ions in layers of LDH structures or by impregnation as a metal salt, to promote the oxidation of sulfur dioxide.

27 Claims, 5 Drawing Sheets

LAYERED DOUBLE HYDROXIDE SORBENTS FOR THE REMOVAL OF $SO_x$ FROM FLUE GAS RESULTING FROM COAL COMBUSTION

BACKGROUND OF THE INVENTION (1) Field of the Invention

The present invention relates to the preparation of sorbents, which are particularly useful for the removal of sulfur dioxide and sulfur trioxide from gas mixtures, particularly from the flue gases of coal-burning power plants.

(2) Prior Art

In fossil-fuel-fired power plants, the sulfur content of the feed coal is oxidized during combustion to sulfur oxides ($SO_2$ and $SO_3$, commonly referred to as "$SO_x$"), which are released through stacks to the atmosphere, and are responsible for deposition as "acid rain". Analyses of flue gas produced by power plants burning coal before desulfurization, show 0.5%–0.2% $SO_2$ and about 0.005% $SO_3$. Control of $SO_x$ emission is mandated by the US Environmental Protection Agency (EPA), and various studies are under way to develop methods for its removal from flue gas streams.

Formation of $SO_x$ in combustion processes can be reduced by modifying the burner design and combustion system, by changing the operating conditions and by using fuels with lower sulfur contents. The most popular and inexpensive method of reducing $SO_x$ emission is the addition of reactive dry sorbents with the fuel. Accordingly at present, $SO_x$ removal is most often accomplished by using lime (CaO) or lime stone ($CaCO_3$). Several other basic sorbents like MgO, ZnO also are found to be effective in removing $SO_x$. For a review on dry sorbents see for example, Komppa, V., "Dry Adsorption Process for Removal of $SO_x$ and $NO_x$ in Flue Gases—a review," *Paperii ja Puu*, 5, 401 to 405 (1986).

Use of Group 2 (formerly Group IIA) metal oxides such as magnesium and calcium oxides as $SO_x$ sorbents has been disclosed in several patent disclosures and recent examples include U.S. Pat. Nos. 3,835,031 and 3,699,037. Several other metal oxides of varying effectiveness as $SO_x$ sorbents are described in U.S. Pat. No. 4,153,534 which include oxides such as sodium, scandium, titanium, iron, chromium, molybdenum, manganese, cobalt, nickel, copper, zinc, cadmium, rare earth metals, and lead.

In typical coal-fired power plants the ground sorbent, for example lime or limestone, is added into boilers along with coal or sprayed into towers as a slurry to contact the flue gas. The $SO_2$ reacts with calcium hydroxide to form a calcium sulfite slurry which is then partially oxidized with air to calcium sulfate. In this way the sulfur oxides are retained as harmless solid compounds which can be removed from the stack gas by electrostatic precipitation or other standard methods. Such a process is potentially attractive for retrofitting existing power plants since no major structural alterations are required.

A major problem with this type of process is low utilization of the oxide sorbents. The rate of adsorption of $SO_x$ declines rapidly with increasing conversion, due to mass transfer limitation and low reactivity of $SO_2$. Hence in the relatively short contact time available, only a small fraction of the sorbent reacts. In principle the problem of low utilization of the sorbents may be solved by reducing the particle size, but in practice, the particle size required for a reasonable level of utilization may be too small to achieve economically by conventional grinding or fragmentation methods.

Thermodynamic calculations indicate that the capture of sulfur trioxide with metal oxides is more favorable compared to sulfur dioxide. Several experimental results have suggested that catalytic oxidation of sulfur dioxide to sulfur trioxide can be beneficial for stack gas desulfurization. Kocheffe & Karman in *Cand. J. Chem. Eng.*, 63, 971 to 977 (1985) has shown that the rate of reaction of $SO_3$ with Ca, Mg and ZnO is greater than that of sulfur dioxide with the same oxides under identical conditions. Furthermore, inclusion of $Fe_2O_3$ (as a $SO_2$ oxidation catalyst) leads to more effective utilization of the lime. The addition of a small amount of $Fe_2O_3$ gave both a more rapid initial uptake rate and a much higher final conversion of the lime (80–90%). In the absence of an oxidation catalyst the rate of $SO_2$ absorption declined sharply at about 70% conversion.

A similar approach has been employed in designing $SO_x$ sorbents for fluid catalytic cracking (FCC) processing of petroleum. These sorbents, among other things, are mostly alkaline earth metal spinels containing one or more other metal components capable of oxidizing sulfur dioxide. For example, U.S. Pat. Nos. 4,472,532 and 4,492,678 relate to the incorporation of iron, chromium, vanadium, manganese, gallium, boron, cobalt, platinum, cerium as oxidation catalyst.

Therefore, in designing improved sorbents for $SO_x$ removal, one must synthesize materials that will (i) oxidize $SO_2$ to $SO_3$, (ii) chemisorb the $SO_3$ formed, and (III) be able to release the adsorbed $SO_x$ for the regeneration of the sorbents or form stable materials for the safe deposition of the spent solid sorbents. The $SO_x$ emitted from these spent sorbents can be captured safely and can be utilized in sulfuric acid or sulfur production. These requirements can be achieved by employing high surface area basic sorbents which contain oxidation catalysts to facilitate the conversion of $SO_2$ to $SO_3$. This invention discloses a new class of $SO_x$ sorbents prepared from Layered Double Hydroxides (LDHs).

European Patent Application EP-A No. 278 535 has recently, described a catalyst composition suitable for the refining of heavy sulfur- and metal-containing petroleum feeds. Thus, the catalyst composition according to the disclosure contained a catalytically active zeolitic material such as ZSM-5, ZSM-11 etc. for the conversion of hydrocarbons, an anionic clay material with an LDH structure for the binding and removal of sulfur oxides, and a matrix material such as kaolin or alumina. Preferred catalyst compositions contained 1 to 30 percent amounts of anionic clay compositions, based on total catalyst composition.

In this present invention by us, a focus has been made to develop sorbent compositions suitable for diminishing $SO_x$ from flue gas streams particularly from coal-fired power plants. Emphasis was made in this invention to develop sorbent compositions which give better $SO_x$ uptake in shorter time duration to overcome the low utilization of common oxide sorbents such as CaO and MgO due to mass transfer limitation and low reactivity of $SO_2$. These objectives and others will become apparent in the following discussions and furthermore, the superiority of the sorbents disclosed in this invention compared to compositions according to EP-A 278 535 will become clear.

LDHs are a group of anionic clay minerals. These have positively charged sheets of metal hydroxides, between which are located anions and some water molecules. Most common LDHs are based on double hydroxides of such main group metals as Mg, and Al and transition metals such as Ni, Co, Cr, Zn and Fe etc. These clays have structure similar to brucite in which the magnesium ions are octahedrally surrounded by hydroxyl groups with the resulting octahedra sharing edges to form infinite sheets. In the LDHs, some of the magnesium is isomorphously replaced by a trivalent ion, such as $Al^{3+}$. The $Mg^{2+}$, $Al^{3+}$, $OH^-$ layers are then positively charged, necessitating charge balancing by insertion of anions between the layers.

One such anionic clay is hydrotalcite in which the carbonate ion is the interstitial anion, and has the idealized unit cell formula $[Mg_6Al_2(OH)_{16}](CO_3).4H_2O$. However the ratio of Mg/Al in hydrotalcite-like can vary between 1.7 and 4 and various other divalent and trivalent ions may be substituted for Mg and Al. In addition, the anion which is carbonate in hydrotalcite, can be varied in synthesis by a large number of simple anions such as $NO_3^-$, $Cl^-$, $OH^-$, $SO_4^{2-}$ etc. These LDHs, based on their structure, fall into the Pyroaurite-Sjogrenite group, where brucite-like layers carrying a net positive charge alternate with layers in which the oxygen atoms of carbonate groups and water molecules are distributed on a single set of sites.

Hydrocalumite and related synthetic compounds also have a layered structure in which positively charged metal hydroxide layers alternate with the interlayers containing anions and water. The hydroxide layers contain specific combinations of metal ions derived from on one had divalent calcium cations and on the other from trivalent cations of metals such as iron, or more particularly, aluminium. The interlayers contain anions such as $OH^-$, $SO_4^{2-}$, $Cl^-$, $NO_3^-$ and, in particular $CO_3^{2-}$. The general formula for the group is $[Ca_2M^{3+}(OH)_6]X.yH_2O$, where $M^{3+}$ is a tripositive ion and typically $Al^{3+}$, X is a singly charged anion or equal amounts of more highly charged ones, and y is between 2 and 6. As in the Pyroaurite-Sjogrenite group, principal layers alternate with inter-layers, the principal layers having the composition $[Ca_2M^{3+}(OH)_6]+$ and the inter-layers consisting of water molecules and anion X. However, because of the difference in size between the $Ca^{2+}$ and $Al^{3+}$ ions, the $M^{2+}:M^{3+}$ ratio is fixed at 2:1 and their arrangement is ordered. The only known natural mineral in the group is hydrocalumite the composition of which is approximately $[Ca_2Al(OH)_6](OH)_{0.75}(CO_3)_{0.125}.2.5H_2O$, but there are many synthetic analogues such as $[Ca_2Fe(OH)_6](SO_4)_{0.5}.3H_2O$, $[Ca_2Al(OH)_6](OH).6H_2O$ etc.

The syntheses of LDHs are generally simple, and the so called "precipitation method" is most popular. If a carbonate-containing product is desired, then the aqueous solution of magnesium and aluminum salts, i.e., nitrate, or chloride, is added to a aqueous solution of sodium hydroxide-carbonate with good mixing at room temperature. The resulting amorphous precipitate is then heated for several hours at 60°-200° C. to obtain a crystalline material. Washing and drying complete the synthesis in quantitative yield. By employing this precipitation method, replacement of all or part of $Mg^{2+}$ with other $M^{II}$ ions such as $Ca^{2+}$, $Zn^{2+}$, $Cu^{2+}$ etc., or replacement of $Al^{3+}$ with other $M^{III}$ ions such as $Fe^{3+}$, $CR^{3+}$ etc., is also possible.

Another important aspect of the synthesis of these materials is the variation of the nature of the interstitial anion. The preparation of hydrotalcite-like materials with anions other than carbonate in pure form requires special procedures, because LDH incorporates carbonate in preference to other anions. Most of the time the smaller anions are introduced to the LDH structure, via the precipitation method by using the desired anion solutions instead of carbonate. However, in these methods the synthesis has to be carried out in an anaerobic condition to prevent carbonate contamination from the atmospheric carbon dioxide. These methods of preparation of LDHs have been described in prior art publications, particular reference being made to following review journal articles by S. L. Suib et. al., in *Solid State Ionics*, 26, 77 to 86 (1988), and W. T. Reichel in *CHEMTECH*, 58 to 63 (1986).

Process for the synthesis of hydrotalcite-like clays also have been the subject of a number of patents. Miyata et. at. in U.S. Pat. Nos. 3,796,792, 3,879,523, and 3,879,525 describes hydrotalcite-like derivatives with both cationic layer and anionic substitution including the smaller transition metal anions like $CrO_4^{2-}$, $MoO_4^{2-}$, and $Mo_2O_7^{2-}$. Both composition and preparative methods are described, and the compositions are said to be useful for catalytic purposes, absorbents, desiccants and the like. Synthetic hydrotalcite-like derivatives with small anions, including anions of transition elements, and also large organic anions such as long chain aliphatic dicarboxylates, are shown to catalyze aldol condensation effectively.

The nature of the thermal decomposition of LDHs especially the hydrotalcite-like materials, have been studied in detail. For example, upon thermolysis, hydrotalcite $[Mg_6Al_2(OH)_{16}](CO_3).4H_2O$ loses weight in two stages. First, it loses the four interstitial water molecules when heated to 200° C., while retaining the skeletal hydroxide and the interlayer carbonate. Additional heating from 275° C. to 450° C. results in the simultaneous loss of hydroxyl groups and carbonate as water and carbon dioxide, respectively. Reichle in *J. Catal.* 101, 352 to 359 (1986) has shown that this heating of hydrotalcite was accompanied by an increase in the surface area from about 120 to about 230 $m^2/g$ ($N_2$/BET) and a doubling of pore volume (0.6 to 1.0 $cm^3/g$, Hg intrusion). Further heating to higher temperatures causes lowering of surface area as well as reactivity. At 1000° C., the formation of MgO and the spinel phase, $MgAl_2O_4$ has been observed.

Thus, the thermal decomposition of LDHs leads to the formation of active metal oxides with fairly high basic character ($pKa \leq 35$) and high surface area. These thermally treated materials should have exceptionally well-dispersed reactive metal centers, as judged from their catalytic properties. These properties have led us to synthesize and to utilize new thermally treated LDH materials as efficient sorbents for flue gas desulfurization.

OBJECTS

It is therefore an object of the present invention to provide novel sorbent compositions which oxidize $SO_2$ to $SO_3$, remove the $SO_3$ and then disposing the spent sorbents as solid waste. These and other objectives will be increasingly apparent by reference to the following description and the drawings.

IN THE DRAWINGS

GENERAL DESCRIPTION

Figure 1:
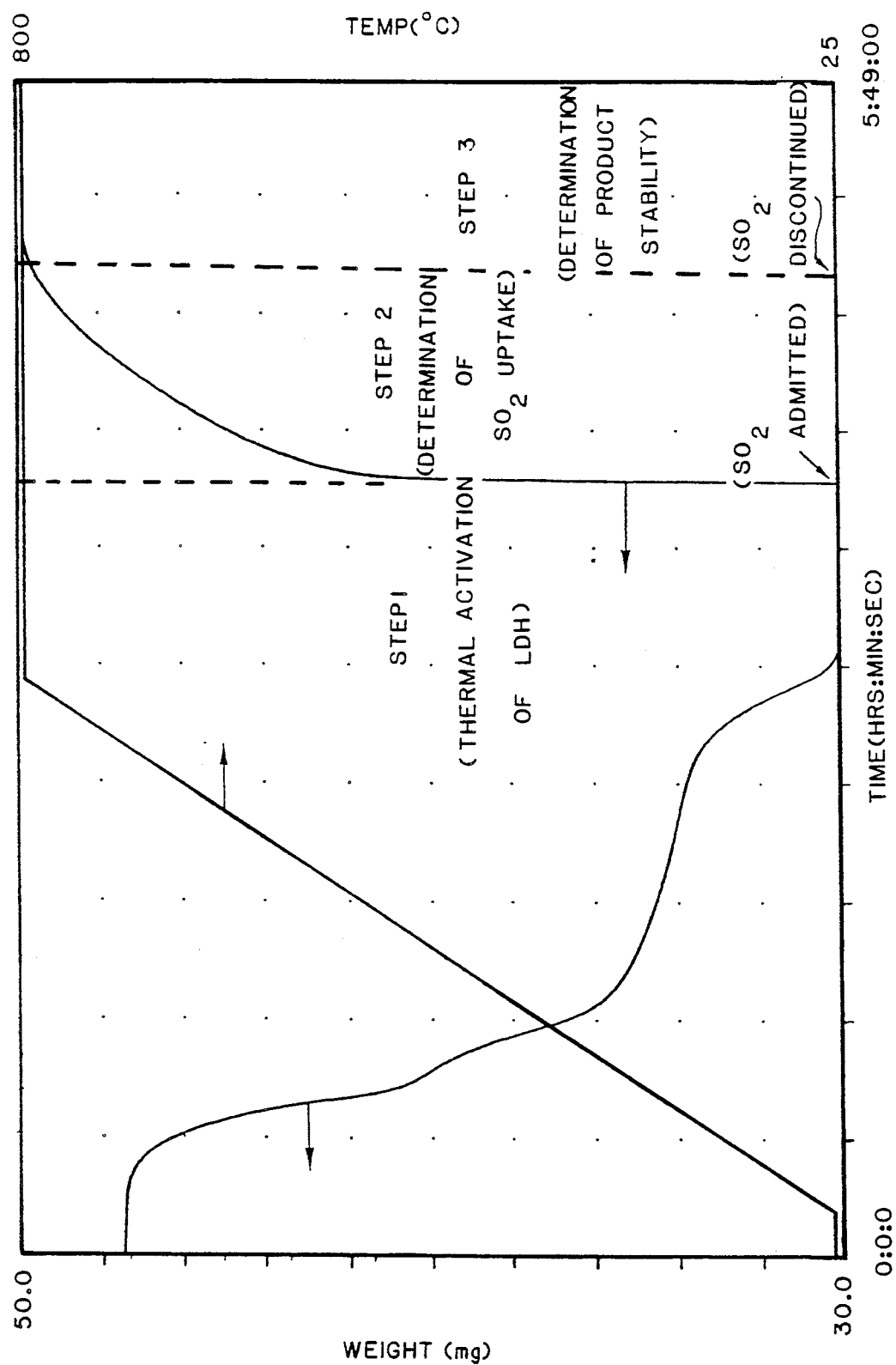
FIG. 1 is a graph of a thermogravimetric analysis (TGA) plot for Thermal Activation of $[Ca_6Al_2(OH)_{16}](CO_3).xH_2O$ as the layered double hydroxide (LDH).

The present invention relates to a process for removing sulfur oxides from flue gases and wherein that sorbent composition has a layered double hydroxide structure of the formula:

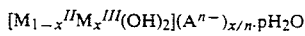

$$[M_{1-x}^{II}M_x^{III}(OH)_2](A^{n-})_{x/n}.pH_2O$$

wherein $M^{II}$ is a divalent metal and $M^{III}$ is a trivalent metal, A is an anion of charge n−, and x is between 0.8 to 0.12, and p is a positive number.

Thus the present invention relates to the syntheses of layered double hydroxide compositions, more specifically hydrotalcite-like and hydrocalumite-like materials, which are suitable for the absorption of $SO_x$ from flue gas streams. Also described herein is the incorporation of other metal components, preferably transition metal ions, capable of promoting the oxidation of sulfur dioxide to sulfur trioxide at calcination temperatures. These second metal components are incorporated to the LDH by (i) impregnation with metal salts, or (ii) by isomorphous substitution into the layers of the LDH structure.

Another aspect of this invention discloses the reactivity of LDH sorbents at different temperatures, particularly at 500°–1000° C., with $SO_2$ such that the sorbents find particular use in diminishing the emissions of sulfur oxides form the coal-fired boilers.

Thus the present invention relates to the synthesis of layered double hydroxide compositions, more specifically hydrotalcite-like and hydrocalumite-like materials of formula, $[M_{1-x}^{II}M_x^{III}(OH)_2](A^{n-})_{x/n}.pH_2O$ wherein $M^{II}$ is one or more divalent metal ions and $M^{III}$ is one or more trivalent metal ions, A is an anion of charge n−, and x is between 0.8 and 0.12, which are suitable for the absorption of $SO_x$. Both $M^{II}$ and/or $M^{III}$ comprise in total or inpart metals (preferably from group 2, 12 and 13, which were formerly IIA, IIB and IIIA respectively) that form reactive basic oxides at calcination temperatures (preferably above 500° C.) that are capable of reacting with $SO_x$. Accordingly, the preferred LDHs for use in the present invention comprise of these metals in the brucite-like [$Mg(OH)_2$-like] layers, in particular magnesium, calcium and aluminum. Other alkaline earth metal ions, such as strontium, barium and mixtures of thereof may replace all or a part of magnesium or calcium ions.

In a broader sense this invention considers the use of these LDH sorbents in controlling the sulfur oxides from gas streams, more particularly from coal-fired boiler systems. These systems include a boiler, economiser and dust collectors such as electrostatic precipitator or bag filter house ("bag house"). The injection of the sorbents into these, particularly to the boiler (700°–1000° C.), along with the coal, or onto the electrostatic precipitators (hot side temperature 400°–500° C.) has been considered in this invention. Thus, the LDH sorbents were thermally treated in a temperature-programmed thermogravimetric balance at a temperature in the range of 500°–1000° C. in a stream of air or nitrogen, and $SO_2$ gas was introduced. The amount of $SO_2$ that reacted with the sorbents was monitored as the weight uptake.

The reaction of thermally activated Ca/Al LDH, $[Ca_6Al_2(OH)_{16}](CO_3).xH_2O$ (hereafter referred to as $Ca_3Al$-LDH) with $SO_2$ provided a general description of the typical experimental method used to investigate reactivity. $Ca_3Al$-LDH was heated to 800° C. under a stream of air in a temperature controlled thermogravimetric balance at a rate of 5° C./min. The sample was calcined at 800° C. for an additional one hour (Step 1 in FIG. 1). During the above calcination process the sample lost weight due to the removal of $CO_2$ and $H_2O$. This sample was then exposed to $SO_2$-containing stream of air at 0.5% v/v concentration, at a flow rate of 200 ml/min for 1 h (Step 2). A weight gain of 66.52% was observed. This corresponded to the amount of $SO_x$ absorbed to form the metal sulfate, $CaSO_4$. The diffraction peaks observed in the X-ray diffraction pattern of the final product were due to crystalline $CaSO_4$ and no crystalline peaks were seen for $Al_2(SO_4)_3$, indicating that the calcium sites were the reactive species at this temperature. Thus, the weight gain of 66.52% corresponds to a conversion of 59.3% Ca sites to $CaSO_4$. After 1 h reaction the addition of $SO_2$ to the gas stream was discontinued, and the sample weight was monitored for another 1 h in Step 3 in order to determine the thermal stability of the product at the reaction temperature in the absence of $SO_x$. The $CaSO_4$ formed was found to be stable at 800° C. for all the calcium containing sorbents disclosed in this invention. Under similar conditions described above the hydrocalumite-like $Ca_2Al$-LDH, $[Ca_2Al(OH)_6](NO_3).xH_2O$ showed a 65.85% weight uptake, which corresponded to a 80% conversion of Ca sites to $CaSO_4$.

In another embodiment disclosed in this invention $Mg_3Al$-LDH, hydrotalcite, $[Mg_6Al_2(OH)_{16}](CO_3).xH_2)$ was heated to 700° C. under a stream of air according to the conditions described above. When this calcined sample was exposed to $SO_2$-containing stream of air, a weight gain of 6.2% was observed. The diffraction peaks observed in the X-ray diffraction pattern of the final product were due to crystalline $MgSO_4$, indicating that the magnesium sites were the reactive species at this temperature. The weight uptake observed corresponded to a 4.4% conversion of MgO to $MgSO_4$. However, this value is low compared to the other modified sorbents described later in this invention. The product formed was found to be stable at 700° C. after the flow of $SO_2$ was ceased, but at higher temperatures, especially at temperatures above 800° C., the $MgSO_4$ formed was found to be unstable. However, this instability does not preclude the use of Mg-containing LDH sorbents at temperatures above.

Also described herein is the incorporation of a third metal component to promote the oxidation of sulfur dioxide to sulfur trioxide. The third metal component is preferably a component of a metal selected from the transition metals, rare earth metals, and Group 14 in the periodic table. Some of the known transition metal and transition metal oxide catalysts that are suitable for $SO_2$ oxidation include Pt, $WO_3$, Ag, $Ag_3VO_4$, $Cu_3(VO_4)_2$, $V_2O_5$, $Fe_2O_3$, $TiO_2$, CuO, $CrO_3$, $MnO_2$, $PbO_2$, $MoO_3$, $CeO_2$, $Cr_2O_3$, $SnO_2$ and ZnO. Platinum is an excellent oxidation catalyst, and other oxides such as vanadium pentoxide and iron oxides are also especially effective for catalyzing the oxidation of $SO_2$ to $SO_3$; see for example, Neuwmann et. al. in, *A. Electrochem.*, 38, 304 to 310 (1932). The catalytic process on these oxides will involve the following steps: sorption of $SO_2$ to form a sulfite, oxidation of sulfite to sulfate, and sulfate decomposition with evolution of $SO_3$. Thus, for a particular metal oxide sorbent, the selection of a good metal oxide catalyst for $SO_2$ oxidation is very important. Requirements for a good catalyst can be compared to those for the $SO_2$ sorbent. For the catalyst, all three steps are surface reactions and should occur at the reaction temperature. For the $SO_2$ sorbent, the first two steps occur at the reaction temperature. For the $SO_2$ sorbent, the first two steps should occur as bulk reactions converting much of the sorbent to sulfate during sorption at the reaction temperature. The last step should occur at a higher temperature.

Particularly good results were achieved as disclosed in this invention when iron or vanadium was introduced to the LDH as the third metal. These metals were incorporated into the LDH sorbent compositions by impregnation of metal salts and by chemical means into the LDH structure during the synthesis.

Impregnation with an oxidation catalyst may be carried out by contacting the layered double hydroxide with a solution of the metal salt, preferably an aqueous solution. The salt can be a simple water-soluble form such as a nitrate, carbonate, sulfate, chloride, acetate, formate or it may be a water soluble metal complex containing chelates such as oxalate, malonate, succinate, glutarate, maleoate, phthalate, tartarate, acetylacetonate and its derivatives, hydrazine and its derivatives and mixtures of above. The primary criterion for choosing a complexing agent or agents is that the agent of the agents chosen provide a "water soluble" metal compound, and should not have a substantial detrimental effect on the present process or on the product layered double hydroxide composition. The LDH impregnated by metal salt, when dried and thermally treated to reaction temperature, may exist in the final product at least in part as a compound such as the oxide, sulfide, halide and the like or in the elemental state.

In one embodiment disclosed here, hydrotalcite $[Mg_6Al_2(OH)_{16}](CO_3).xH_2O$, when impregnated with $Fe(NO_3)_3$ solution showed enhanced $SO_x$ uptake compared to the free hydrotalcite at a temperature at 700° C. as shown in Table 1:

TABLE 1

Effect of $Fe(NO_3)_3$ Impregnation on $SO_2$ uptake by $[Mg_6Al_2(OH)_{16}](CO_3).xH_2O$ at 700° C.

| % $Fe_2O_3^a$ | % Wt. uptake after 1 h | % Conversion$^b$ |
|---|---|---|
| 0.0 | 6.2 | 4.4 |
| 2.5 | 9.0 | 6.6 |
| 5.0 | 41.0 | 30.8 |
| 10.0 | 49.0 | 38.6 |

TABLE 1-continued

Effect of $Fe(NO_3)_3$ Impregnation on $SO_2$ uptake by $[Mg_6Al_2(OH)_{16}](CO_3).xH_2O$ at 700° C.

| % $Fe_2O_3^a$ | % Wt. uptake after 1 h | % Conversion$^b$ |
|---|---|---|

$^a$Expressed as, $\dfrac{g. Fe_2O_3}{g. MgO + g. Al_2O_3 + g. Fe_2O_3} \times 100$ $^b$Fraction of Mg as MgO converted to $MgSO_4$ after 1 h. reaction time.

Figure 5:
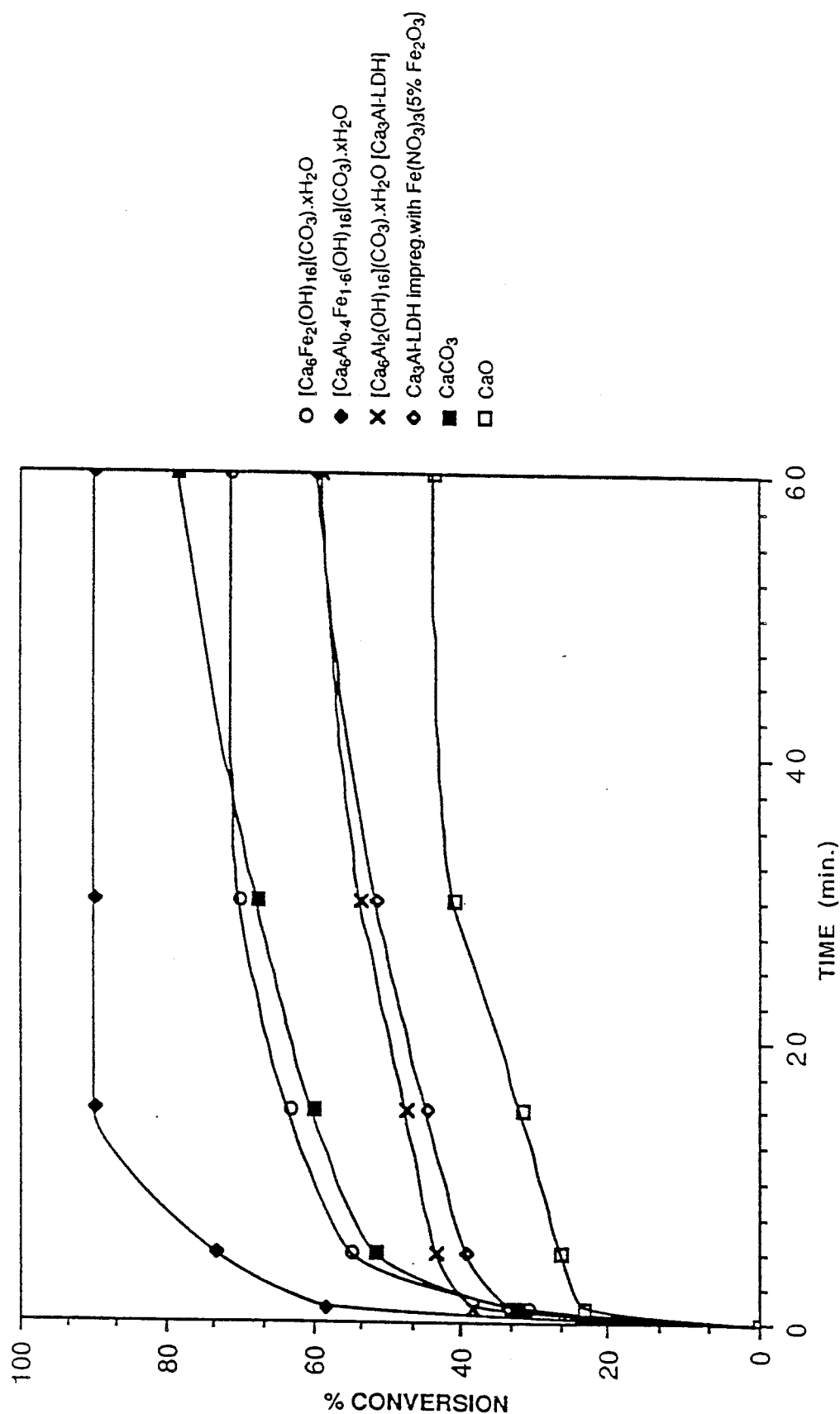
FIG. 5 is a graph comparing the $SO_2$ uptake by different Ca containing sorbents prepared according to this invention and sorbents presently used in flue gas desulfurization.

Especially good results were obtained when iron, calculated as $Fe_2O_3$, in the range of 5 to 10% by weight of total oxides in hydrotalcite. Similarly when $[Ca_6Al_2(OH)_{16}](CO_3).xH_2O$ when impregnated with $Fe(NO_3)_3$ solutions resulted in better initial uptake of $SO_x$ (FIG. 5). For example when iron incorporated in this manner was 5% $Fe_2O_3$ by weight of total oxides, the $SO_x$ uptake after 5 min. increased from 39% for iron free $Ca_3Al$-LDH to 44% for iron incorporated LDH. In a similar manner, other metals that are capable of forming oxides which oxidize $SO_2$ to $SO_3$ can be incorporated to the hydrotalcite-like materials by this incipient wetness technique, using their water soluble salts. In another embodiment disclosed herein, when hydrotalcite was impregnated with $NH_4VO_3$ to incorporate vanadium, an enhanced $SO_x$ uptake was achieved. For example, when the amount of vanadium present in the sorbent was 5% $V_2O_5$ by weight of total oxides, the sample showed 46.7% weight uptake, which was equivalent to 35% conversion of the magnesium sites in the sorbent to magnesium sulfate.

More preferably, the metal catalyst component or components can be incorporated into the LDH structure by chemical means during synthesis. These metal components can be introduced into the $[M_{1-x}{}^{II}M_x{}^{III}(OH)_2]$ layers in a such a way, that a part or whole of the $M^{II}$ and/or $M^{III}$ is replaced by sulfur dioxide oxidizing metals described earlier. Accordingly, other metal ions, such as copper, zinc, cobalt, iron, cadmium, mercury, lead, manganese, tin, nickel, palladium and mixtures thereof may replace all or part of alkaline earth metal $M^{II}$ in LDH. Similarly, other metal ions such as iron, chromium, vanadium, manganese, gallium, boron, cobalt, and mixtures thereof may replace all or part of the $M^{III}$ aluminum ion in hydrotalcite-like materials.

In certain embodiments described in this invention a part or all of $Al^{3+}$ in hydrotalcite is replaced by the $SO_2$ oxidation catalyst, $Fe^{3+}$ in order to achieve better $SO_x$ sorption as shown in Table 2:

TABLE 2

$SO_2$ uptake by $[Mg_6Al_{2-y}Fe_y(OH)_{16}](CO_3).xH_2O$ LDH Compositions at 700° C.

| y | Mg:Al:Fe Ratio | Wt % $Fe_2O_3^a$ | % Wt. uptake after 1 h | % Conversion$^b$ |
|---|---|---|---|---|
| 0 | 3:1:0 | 0 | 6.2 | 4.4 |
| 0.4 | 3:0.8:0.2 | 9.0 | 18.2 | 13.5 |
| 0.8 | 3:0.6:0.4 | 17.4 | 59.0 | 43.6 |
| 1.2 | 3:0.4:0.6 | 25.3 | 98.1 | 75.6 |
| 1.6 | 3:0.2:0.8 | 32.8 | 119.0 | 96.7 |
| 2.0 | 3:0:1 | 39.8 | 107.0 | 89.9 |

$^a$Expressed as, $\dfrac{g. Fe_2O_3}{g. MgO + g. Al_2O_3 + g. Fe_2O_3} \times 100$ $^b$Fraction of Mg as MgO converted to $MgSO_4$ after 1 h. reaction time.

These materials were prepared using the "precipitation method" by adding mixed metal nitrate solutions of $Mg^{2+}$, $Al^{3+}$ and $Fe^{3+}$ with required concentrations into a solution containing NaOH and $Na_2CO_3$. The precipitates formed were digested at 65° C. for 18 hours to obtain pure crystalline hydrotalcite-like mixed metal LDHs. It is preferred that the amount of aluminum replaced by iron in hydrotalcite be between 2% to 100%, more preferably between 60% to 100%. In a preferred example, a LDH sorbent with a Mg/Al/Fe ration of 3/0.2/0.8 resulted in a 119.0% uptake on a weight basis at 700° C. when exposed to 0.5% v/v $SO_2$ in a stream of air (200 ml/min) for one hour. The weight uptake corresponded to 96.7% conversion of the MgO component to $MgSO_4$. During the preparation procedure of this mixed metal LDH, the precipitates isolated soon after the addition of metal salts at ambient temperature showed broadened hydrotalcite-like peaks in the X-ray diffraction patterns, indicating a LDH phase with a relatively small crystallite size. We have also tested these latter materials at 700° C. for their uptake capabilities using a procedure similar to that described earlier. For example, a freshly precipitated $Mg_3Fe$-LDH showed a conversion of 17% Mg sites to $MgSO_4$. This was higher than for hydrotalcite, but lower than for well-crystallized $Mg_3Fe$-LDH prepared by digesting the solid product at 65° C.

In another embodiment, all of $Mg^{2+}$ in hydrotalcite is replaced by a $SO_2$ oxidation catalyst $Fe^{2+}$, using the precipitation method described earlier. This LDH sorbent having a Fe:Al 3:1 ratio with an ideal formula of $[Fe_6Al_2(OH)_{16}](CO_3).xH_2O$ showed a weight uptake of 3.9% at 700° C. in the presence of $SO_2$ under the conditions described above. This corresponded to a 10% conversion of Al sites to $Al_2(SO_4)_3$. The X-ray diffraction pattern of the product formed showed the peaks due to $Al_2(SO_4)_3$ indicating the reactivity of Al sites. Compared to hydrotalcite, the incorporation of Fe for Mg in the layers enhanced the $SO_x$ uptake. The products formed, $Al_2(SO_4)_3$ was found to be unstable at this temperature (700° C.) undergoing weight loss when the passage of $SO_2$ was ceased.

Similarly, in another embodiment, a part of the $Mg^{2+}$ in hydrotalcite is replaced by the $SO_2$ oxidation catalyst $M^{II}$, where $M^{II}$ is selected from transition metals such as $Ni^{2+}$, $Mn^{2+}$, $Cu^{2+}$ and $Co^{2+}$, to obtain sorbent compositions with an ideal formula of $[M^{II}_{0.8}Mg_{2.2}Al(OH)_8]$-$(CO_3)_{0.5}.xH_2O$. These materials also prepared using the "precipitation method" by mixing the mixed metal nitrate solutions of $Mg^{2+}$, $Al^{3+}$ and $M^{II}$ with required concentrations with a solution containing NaOH and $Na_2CO_3$ while keeping the pH around 10-11. The resulting slurries were digested for about 18 h. at 60° C. Compared to hydrotalcite where no $SO_2$ oxidation catalyst was present, all these sorbents showed enhanced initial $SO_2$ uptake and overall $SO_2$ uptake, when exposed to a 0.5% (v/v) $SO_2$ in a stream of air for 1 h at 800° C. as shown in Table 3:

TABLE 3

$SO_2$ uptake by $[M^{II}_{0.8}Mg_{2.2}Al(OH)_8](CO_3)_{0.5}.xH_2O$ LDH Compositions at 800° C.

| $M^{II}$ | Wt % $M^{II}O^a$ | % Wt. uptake after 1 h | % Conversion[b] |
|---|---|---|---|
| Mg[c] | — | 6.4 | 4.5 |
| Mn | 28.9 | 23.8 | 26.6 |
| Ni | 29.9 | 11.0 | 12.4 |
| Co | 30.0 | 30.6 | 34.6 |
| Cu | 31.3 | 28.9 | 33.4 |

[a]Expressed as $\dfrac{g. M^{II}O}{g. MgO + g. Al_2O_3 + g. M^{II}O} \times 100$
[b]Fraction of Mg as MgO converted to $MgSO_4$ after 1 h. reaction time.
[c]Hydrotalcite, $[Mg_3Al(OH)_8](CO_3)_{0.5}.xH_2O$ with no $SO_2$ oxidation catalyst.

For example, the Co containing LDH, $[Co_{0.8}Mg_{2.2}Al(OH)_8](CO_3)_{0.5}.xH_2O$ was found to undergo 34% conversion of Mg sites to $MgSO_4$ under the conditions described above. Moreover, this conversion was completed over the initial 5 minute period.

In yet another embodiment, a part or all of the $Al^{3+}$ in $[Ca_6Al_2(OH)_{16}](CO_3).xH_2O$ is replaced by $Fe^{3+}$, a $SO_2$ oxidation catalyst. These materials also are prepared by the "precipitation method" described above. Mixed metal nitrate solution of $Ca^{2+}$, $Al^{3+}$ and $Fe^{3+}$ with the required metal ion ratios is mixed with a solution containing NaOH and $Na_2CO_3$ at 60° C. while keeping the pH around 12-13. The resulting white precipitate was further digested for 1 h. at 60° C. to obtain mixed metal crystalline products with LDH structures. All the LDH sorbents that contained iron showed improved initial $SO_2$ uptake and overall $SO_2$ uptake when exposed to a 0.5% (v/v) $SO_2$ in a stream of air for 1 h at 800° C. as shown in Table 4:

TABLE 4

$SO_2$ uptake by $[Ca_6Al_{2-y}Fe_y(OH)_{16}](CO_3).xH_2O$ LDH compositions at 800° C.

| y | Ca:Al:Fe Ratio | Wt % $Fe_2O_3^a$ | % Wt. uptake after 1 h | % Conversion[b] |
|---|---|---|---|---|
| 0 | 3:1:0 | 0 | 65.04 | 59.3 |
| 0.4 | 3:0.8:0.2 | 7.1 | 74.06 | 69.4 |
| 0.8 | 3:0.6:0.4 | 13.5 | 79.85 | 76.7 |
| 1.2 | 3:0.4:0.6 | 20.8 | 91.45 | 90.0 |
| 1.6 | 3:0.2:0.8 | 26.4 | 88.95 | 89.7 |
| 2.0 | 3:0:1 | 32.2 | 65.97 | 68.1 |

[a]Expressed as $\dfrac{g. Fe_2O_3}{g. CaO + g. Al_2O_3 + g. Fe_2O_3} \times 100$
[b]Fraction of Ca as CaO converted to $CaSO_4$ after 1 h. reaction time.

It is preferred that the amount of aluminum replaced by iron in $Ca_3Al$-LDH be between 2 to 100%, more preferably between 40% to 80%. In a preferred example, a LDH sorbent with Ca/Al/Fe ratio of 3/0.2/0.8 resulted in a 90.5% uptake on weight basis at 800° C. when exposed to 0.5% v/v $SO_2$ in a stream of air (200 ml/min) for one hour. The weight uptake corresponded to 89% conversion of the CaO component to $CaSO_4$. Furthermore, this material showed excellent initial $SO_2$ uptake, achieving maximum weight uptake in the presence of $SO_x$ within the first 15 min. period (FIG. 5).

The Ca/Al/Fe precipitates obtained by mixing salt solutions at ambient temperature showed broadened peaks in the X-ray diffraction patterns, indicating disordered LDH phases with small crystallite size. Also, these products exhibited a slow transformation during the drying process, with a color change from white to brown. We have tested these materials for their $SO_x$ uptake capabilities at 800° C. using a procedure similar to the one described earlier. For example the $Ca_3Fe$-LDH which contained a partially ordered LDH phase, showed a conversion of about 80% Ca sites to $CaSO_4$, which was slightly lower than more crystalline $Ca_3Fe$-LDH sorbent prepared at 65° C. The latter sorbent showed a conversion of 89.7% of Ca sites to $CaSO_4$.

In another embodiment, all of the aluminum sites in the hydrotalcite structure were replaced by iron to give a LDH containing 3:1 Mg:Fe. When this sorbent was subjected to air containing 0.5% (v/v) $SO_2$ in the temperature range 500°-1000° C., efficient $SO_x$ sorption, as evidenced by the uptake measurements in FIG. 2 was observed. Optimum $SO_x$ uptakes were obtained at 700°-800° C. Under these latter conditions more than 80% conversion of MgO sites to sulfates was observed (cf. FIG. 2).

Similarly in another embodiment described herein, all of the aluminium sites in the $[Ca_6Al_2(OH)_{16}](CO_3).xH_2O$ structure were replaced by iron to give an LDH containing Ca/Fe in the ratio of 3/1. When this sorbent was subjected to air containing 0.5% (v/v) $SO_2$ gas in the temperature range 700°–1000° C., efficient $SO_x$ sorption, as evident by the uptake measurements in FIG. 3, was observed. Thus, the preferred calcining temperatures for $Ca^{2+}$-containing sorbents are between 800°–1000° C., with the optimum temperature at 900° C.

In another example described in this invention, a sorbent composition with mixed LDH phases were tested for $SO_x$ adsorption. In a preferred example a two-phase LDH sorbent was prepared by adding a solution containing $Mg^{2+}$, $Ca^{2+}$ and $Fe^{3+}$ in the ratio of 1.5:1.5:1 and a second solution containing NaOH and $Na_2CO_3$ into water at 60° C. using a procedure described earlier. The product isolated was found to consist of two phases, identified by XRD, as a 1:1 mixture of Mg/Fe-LDH and Ca/Fe-LDH instead of a single-phase Mg/Ca/Fe-LDH. This mixed-phase sorbent showed efficient initial and overall uptake at 800° C. (FIG. 5). The total weight uptake after 1 h. at 800° C. was 76.26% which corresponded to a 71.2% conversion of Ca and Mg sites to the sulfates.

In another example described in this invention, the effect of $SO_2$ concentration on the $SO_x$ sorption has been considered. A Mg/Fe LDH was contacted with different concentrations of $SO_2$ in a stream of air as shown in Table 5:

TABLE 5

Effect of $SO_2$ concentrations on $SO_2$ uptake by $[Mg_6Fe_2(OH)_{16}](CO_3).xH_2O$ LDH at 700° C.

| $SO_2$ Concentration, % | % Wt. uptake after 1 h | % Conversion[a] |
| --- | --- | --- |
| 0.6 | 95.0 | 79.5 |
| 0.5 | 98.6 | 82.5 |
| 0.4 | 88.8 | 74.3 |
| 0.3 | 78.6 | 65.8 |

[a]Fraction of Mg as MgO converted to $MgSO_4$ after 1 h. reaction time

Preferred $SO_2$ concentrations were 0.4%–0.6% v/v for better sorption.

The compositions disclosed in the present invention may be synthesized from inexpensive starting materials, For example, hydrotalcite-like materials can be prepared starting with MgO and alumina ($Al_2O_3$). Hydrocalumite-like materials or other Ca/Al containing LDHs can be prepared from CaO and alumina. Both CaO and MgO can be obtained by calcining natural minerals such as calcite ($CaCO_3$) and magnesite ($MgCO_3$). Using dolomite ($CaMgCO_3$) one can prepare products containing mixtures of Mg and Ca LDH phases. The $SO_2$ oxidation catalyst can be incorporated into the layers of these LDH sorbents by incorporating $FeCl_3$ solutions in the precipitation procedure. The "pickle liquor" from steel plants, which is the by-product formed after cleaning the steel with dilute hydrochloric acid to remove the iron rust, contains iron chloride. Thus, the liquor can be used as a source of iron chloride in LDH synthesis. Some layered double hydroxides, such as hydrotalcite, are commercially available and some may be naturally occurring. Moreover, methods for their synthesis are known in the art. Thus, a detailed description of such synthesis techniques is not included herein.

The form (i.e., particle size) of the present sorbents, is not critical to the present invention and may vary, depending, for example, on the type of preparation method shown in Table 6:

TABLE 6

Effect of particle size on $SO_2$ Uptake by $[Mg_6Fe_2(OH)_{16}](CO_3).xH_2O$ LDH at 700° C.

| Particle size | % wt. uptake after 1 h | % Conversion[a] |
| --- | --- | --- |
| 50–100 mesh | 96.5 | 80.8 |
| 100–200 mesh | 100.3 | 83.9 |
| –200 mesh | 98.5 | 82.4 |

[a]Fraction of Mg as MgO converted to $MgSO_4$ after 1 h. reaction time.

However, it is preferred that the particle size would be less than 100 mesh size, for a rapid uptake of $SO_x$.

Figure 4:
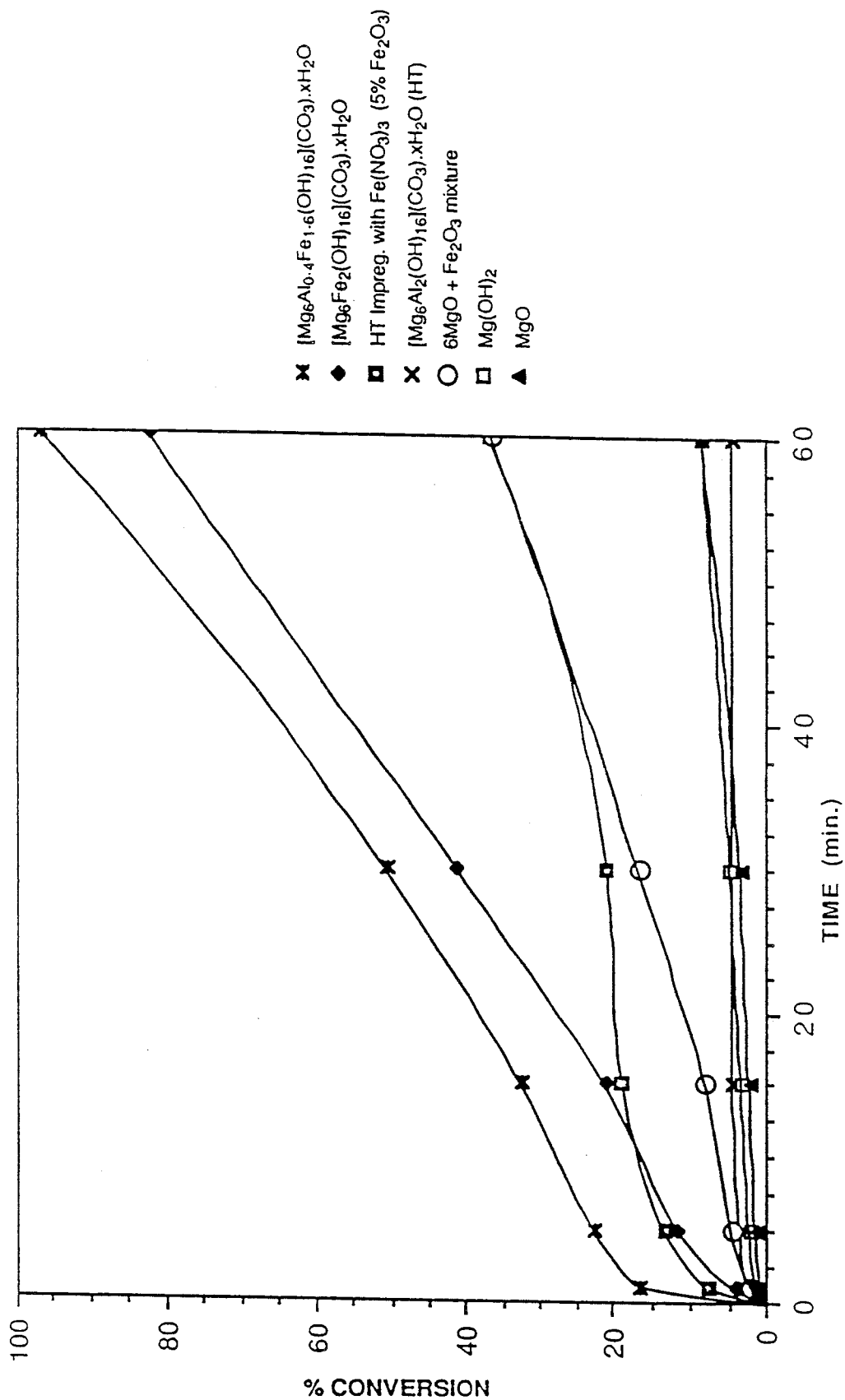
FIG. 4 is a graph comparing the $SO_2$ uptake by different Mg containing sorbents prepared according to this invention and sorbents presently used in flue gas desulfurization.

The $SO_x$ uptake curves for some of the sorbents discussed in this invention are given in FIGS. 4 and 5. It is also evident that the materials which show a good initial uptake are the ones which contain $Fe^{3+}$ as $SO_2$ oxidation catalyst. Furthermore, compositions in which iron is incorporated into the layers by isomorphous replacement of Al showed better $SO_x$ uptake than compositions in which iron is incorporated by impregnation. The LDH sorbents, especially the iron-containing compositions, exhibited superior $SO_x$ sorptivity compared to conventional basic sorbents such as MgO and $Mg(OH)_2$. Under specific reaction conditions, i.e., at 700° C. in a gas stream containing 0.5% $SO_2$ and air, for example, MgO was found to undergo 10.2% conversion to $MgSO_4$ and $Mg(OH)_2$ was found to undergo 14.0% conversion for a reaction period of 1 hour. The incorporation of iron as $Fe_2O_3$ to MgO ($MgO.Fe_2O_3=3:1$) by mixing enhanced the conversion to 36.5%. Conversely, similar mixtures of $Fe_2O_3$ and $Mg(OH)_2[Mg(OH)_2$:$Fe(OH)_3=3:1]$ showed reduced uptakes (9% conversion). Under the same set of reaction conditions the $Mg_3Fe$-LDH disclosed in this invention exhibited 82.5% conversion to $MgSO_4$, much superior to MgO or $Mg(OH)_2$ with or without iron. Moreover, these sorbents exhibited better $SO_x$ uptake than some of the mixed oxide sorbents discussed in the literature. For example, in the publication by A. A. Bhattacharyya et al., in Ind. Eng. Chem. Res. 27, 1356 to 1360 (1988), showed that $CeO_2$ (the $SO_2$ oxidation catalyst) incorporated in $Mg_2Al_2O_5$ spinel exhibited a 6.7% conversion of oxides sites of the sorbent to sulfate form when exposed to $SO_2$ (0.32% v/v) gas for 15 min at 700° C. Under similar conditions the LDH sorbent containing Mg/Al/Fe in the ratio of 3:2:0.8 discussed in this invention, showed more than 20% conversion of MgO sites to $MgSO_4$.

The effect of iron incorporation into the $Ca_3Al$-LDH structure is evident from FIG. 5. The LDH sorbents where, about 50%–λ% Al sites in $[Ca_6Al_2(OH)_{16}](CO_3).xH_2O$ were replaced with Fe showed better initial and overall $SO_x$ adsorption than CaO or $CaCO_3$. At 700° C. in a gas stream containing 0.5% $SO_2$ in air, for example, CaO was found to undergo 44% conversion of CaO sites to $CaSO_4$ and $CaCO_3$ was found to undergo 78% conversion during a reaction period of 1 hour. Under similar conditions the LDH sorbent containing Ca/Al/Fe in the ratio of 3:2:0.8 discussed in this invention, showed more than 90% conversion of CaO sites to $CaSO_4$. Moreover, over the initial 15 min. reaction period this Ca/Al/Fe-LDH sorbent reacted with $SO_x$ to convert 89% of the Ca sites to $CaSO_4$ whereas, for the same period the conversion of Ca sites in $CaCO_3$ was about 60%.

European patent EP-A No. 278 535, which was described herein earlier, disclosed hydrocarbon cracking catalyst compositions containing as a component, anionic clays with LDH structures, for the purpose of binding the $SO_x$ liberated in the refining process, especially when processing high sulfur feeds. The LDH components incorporated many of the known $SO_2$ oxidation catalysts, including rare earth metal ions (eg., $La^{3+}$, $Ce^{3+}$), noble metals (eg., Pt, Rh) and transition metal ions ($Cu^{2+}$, $Fe^{3+}$, $Mn^{2+}$, $Cr^{3+}$). The rare earth and noble metal catalysts were preferred over the transition metal catalysts, in part, because of their greater reactivity. Also, it is known to those skilled in the art that transition metals, particularly iron, are undesirable constituents of petroleum cracking catalysts because they promote the formation of coke. However, iron is an economically attractive $SO_2$ oxidation catalyst for applications where coke formation is not a concern, such as in the reduction of $SO_x$ from the flue gases of coal-burning power plants.

In the preferred invention described herein, we disclose in part that the effectiveness of transition metal ions (particularly iron) in promoting $SO_2$ uptake by LDH materials depends substantially on the transition metal composition, especially when the metal is incorporated into the LDH layers by isomorphous substitution. The incorporation of transition metals into the structure affords an order of increase in $SO_x$ absorption. This teaching is illustrated by the results presented in Table 2 for $SO_2$ uptake at 700° C. by LDH compositions of the type $[Mg_8Al_{2-y}Fe_y(OH)_{16}](CO_3).xH_2O$. At an iron composition of $y=0.4$, which was equivalent to 9.0 wt. % $Fe_2O_3$ incorporation and representative of the iron-promoted LDH composition disclosed in European patent EP-A No. 278 535, the conversion of Mg sites to $MgSO_4$ was 13.5% after the reaction time of 1 h. This represents a small improvement in $SO_2$ uptake relative to the unpromoted LDH ($y=0$) in Table 2), which exhibited a conversion of 4.4% under the same reaction conditions. However, we have found that extending the $Fe^{3+}$ composition beyond $y=0.4$ substantially improves $SO_2$ uptake. For instance, increasing the iron content to $y=0.8$ resulted in a conversion of 43.6%. Further increases in iron content continued substantially to improve the conversion of magnesium to $MgSO_4$ until a maximum conversion of 96.7% was reached at $6=1.6$. Incorporating the maximum amount of iron ($y=2.0$) decreased the conversion to a value of 89.9%. A similar relationship between $SO_2$ uptake and iron content of the LDH was observed for hydrocalumite-type LDH compositions of the type $[Ca_6Al_{2-y}Fe_y(OH)_{16}](CO_3).xH_2O$ as determined by the data in Table 4.

Our invention further discloses the effectiveness of a transition metal promoter, when incorporated into the LDH sorbent by the impregnation method, which also exhibits a novel composition dependence. This teaching was demonstrated by the data in Table 1 for the conversion of Mg sites in $Fe(NO_3)_3$-impregnated $[Mg_6Al_2(OH)_{16}](CO_3).xH_2O$ to $MgSO_4$ after 1 h. reaction with 0.5% (v/v) $SO_2$ in air at 700° C. For an iron content equivalent to 2.5 wt. % $Fe_2O_3$, the conversion was 6.6% versus a value of 4.4% for the unpromoted LDH. However, increasing the amount of impregnated iron to the equivalent of 5.0 and 10.0 wt % $Fe_2O_3$ resulted in conversions of 30.8% and 38.6%, respectively.

In addition, it is readily apparent from a comparison of the results in Table 1 and Table 2, that at low iron loadings the impregnation method affords more efficient LDH sorbents than the chemical method of isomorphous substitution. For instance, for Mg/Al-LDH sorbents at an iron loading of 10.0 wt % $Fe_2O_3$ by impregnation, the conversion to $MgSO_4$ was 38.6% (Table 1), whereas an equivalent loading of 9.0 wt % $Fe_2O_3$ isomorphous substitution gave only 13.5% conversion. Thus, impregnation is preferred over isomorphous substitution, at least when the total iron content of the LDH sorbent is less than the equivalent of about 20 wt % $Fe_2O_3$.

Furthermore, according to the results disclosed in our invention, the LDH sorbents especially Ca/Al/Fe-containing sorbents show superior $SO_x$ sorptivity than $CaCO_3$ or CaO. Thus, the LDH sorbents disclosed in this invention, both Mg and Ca containing derivatives when iron is incorporated as a partial replacement of Al ions, represent improvement over the known sorbents for desulfurizing $SO_2$ containing gas streams.

It is known to those skilled in the art that some of the transition metals, particularly iron, is capable of oxidizing NO to $NO_2$. Thus, the transition metal-containing LDH sorbents, especially the iron-containing sorbents disclosed in this invention may be used to remove $NO_x$ components form flue gas streams and other gas streams. In the gas streams, the calcined LDHs will react with $NO_x$ components to form solid nitrates.

These sorbents may be used, for example, in the form of particles of any suitable size and shape, such particles may be formed by conventional techniques, such as spray drying, pilling, tableting, bead formation and the like.

In the coal-fired boiler application, the present sorbents may be added, either separately or with coal, to the combustion zone, (e.g., the boiler, temp. 700°-1000° C.) when combustion takes place. Sorbents then leave the combustion zone with coal ash and can be removed from the bag house. This process will in turn, provide enough contact time for the sorbents to react with $SO_x$ from the flue gas streams. Thus the flue gas leaving the combustion zone/contacting zone systems have reduced amounts of sulfur oxide relative to the processing in the absence of present sorbents. The reacted sorbents can be safely disposed without any serious environmental pollution, since $SO_x$ in spent sorbents are now in a thermally stable sulfate forms.

The following examples will serve to illustrate certain embodiments of the herein disclosed invention. These examples should not, however, be construed as the limiting scope of the novel invention as there are many variations which may be made thereon without departing from the theme of the disclosed invention.

EXAMPLE 1

The preparation of a hydrotalcite-like $Mg_3Al$-LDH is described in this example.

A solution of 12.8 g $Mg(NO_3)_2.6H_2O$ and 9.4 g $Al(NO_3)_3.9H_2O$ in 100 ml deionized water was added to a solution containing 14 ml 50% NaOH and 5 g $Na_2CO_3$ (anhydr.) in 200 ml distilled water. The addition was carried out very slowly over a period of 90 min. with vigorous stirring. Following the addition, the resulting heavy slurry was heated at $65 \pm 5°$ C. for 18 hours with good mixing. The mixture was then cooled to room temperature, and the precipitate was separated by centrifugation. The solid was washed several times with deionized water until the washings were free of salts and then dried in air. The X-ray diffraction pattern of the dried solid corresponded to hydrotalcite, and the basal spacing was found to be 7.78 Å. Chemical analysis showed the Mg/Al ratio to be 3.2, very near the value expected for hydrotalcite with an idealized formula unit of $[Mg_3Al(OH)_8](CO_3)_{0.5} \cdot xH_2O$.

EXAMPLE 2

The preparation of a hydrocalumite-like $Ca_2Al$-LDH is described in this example.

A solution of 4.72 g $Ca(NO_3)_2 \cdot 4H_2O$ and 3.75 g $Al(NO_3)_3 \cdot 9H_2O$ in 50 ml deionized water was added dropwise to stirred 100 ml distilled water at 65° C. under an atmosphere of nitrogen. The pH of the reaction mixture was maintained at 10.5 by adding a 50% (w/w) solution of NaOH in water. The resulting white suspension was stirred for another 1 h. at 65° C. The mixture was then cooled to room temperature, and the precipitate was separated by centrifugation. The solid was washed several times with deionized water until the washings were free of salts and then dried in air. The X-ray diffraction pattern of the dried solid corresponded to a hydrocalumite-like structure with a basal spacing of 8.68 Å. Chemical analysis showed the Ca/Al ratio to be 2.2, very near the value expected for a LDH structure with an idealized formula unit of $[Ca_2Al(OH)_6](NO_3) \cdot xH_2O$.

EXAMPLE 3

The preparation of a $Ca_3Al$-LDH is described in this example.

A solution of 4.72 g $Ca(NO_3)_2 \cdot 4H_2O$ and 2.50 g $Al(NO_3)_3 \cdot 9H_2O$ in 50 ml deionized water and a solution of 10 g NaOH and 0.25 g $Na_2CO_3$ (anhyd.) in 50 ml deionized water was added dropwise over a period of 45 min. to 50 ml distilled water at 65° C. The pH of the reaction mixture was maintained around 12.5. The resulting white slurry was stirred for another 1 h. at 65° C. The mixture was then cooled to room temperature, and the precipitate was separated by centrifugation. The solid was washed several times with deionized water until the washings were free of salts and then dried in air. The X-ray diffraction pattern of the dried solid corresponded to a layered structure with a basal spacing of 7.59 Å. The XRD also showed the presence of very small amounts of $CaCO_3$. Chemical analysis indicated the Ca/Al ratio to be 3.3, very near the value expected for LDH structure with an idealized formula unit of $[Ca_3Al(OH)_8](CO_3)_{0.5} \cdot xH_2O$.

EXAMPLE 4

Hydrotalcite-like LDH sorbents with the general formula $[Mg_6Al_{2-x}Fe_x(OH)_{16}](CO_3) \cdot yH_2O$ in which some or all of the octahedral aluminum are replaced by iron were prepared according to this example.

The procedure was similar to that described in Example 1, except that a solution containing $Mg(NO_3)_2 \cdot 6H_2O$, $Al(NO_3)_3 \cdot 9H_2O$ and $Fe(NO_3)_3 \cdot 9H_2O$ with different molar ratios, as given in Table 2, were added to the solution containing NaOH and $Na_2CO_3$. The X-ray powder diffraction patterns of the products corresponded to a hydrotalcite-like structure with a basal spacings between 7.6–7.9 Å. Mg:Al:Fe ratios reported in Table 2 were determined by chemical analyses.

EXAMPLE 5

Preparation of pyroaurite, a $Mg_3Fe$-LDH of the type $[Mg_6Fe_2(OH)_{16}](CO_3) \cdot xH_2O$ is described in this example.

A solution containing 7.6 g $MgCl_2 \cdot 6H_2O$ and 2.0 g $FeCl_3$ (anhyd.) in 100 ml deionized water was added to a solution of 1 g NaOH and 5.3 g $Na_2CO_3$ (anhydr.) in 500 ml distilled water. The addition was carried out very slowly over a period of 90 min. with vigorous stirring of the solution. The resulting pale brown heavy slurry was then heated to 65±5° C. for 10 days with good stirring. (The reaction time can be minimized by heating to higher temperatures, without substantial loss of $SO_x$ uptake capabilities.) The mixture was then cooled to room temperature, and the precipitate was separated by centrifugation. The resulting pale brown solid was washed several times with deionized water until the washings were free of salts. The product was then dried in air. The X-ray diffraction powder pattern of the dried solid corresponded to the pyroaurite structure. The basal spacing was found to be 7.78 Å. Chemical analysis showed the Mg/Fe ratio to be 2.8.

EXAMPLE 6

The preparation of a $Fe_3Al$-LDH of the type $[Fe_6Al_2(OH)_{16}](CO_3) \cdot xH_2O$ where all of magnesium in hydrotalcite are replaced by $Fe^{2+}$ is described in this example.

The procedure analogous to Example 1, except that a solution containing 10 g $FeCl_2 \cdot 4H_2O$ and 4.1 g $AlCl_3 \cdot 6H_2O$ in 100 ml water was added under a nitrogen atmosphere to 100 ml of a solution containing 14 ml of 50% (w/w) NaOH and 2 g $Na_2CO_3$. The X-ray powder diffraction pattern of the product isolated corresponded to a hydrotalcite-like layered structure with a basal spacing of 7.77 Å.

EXAMPLE 7

The preparation of LDH sorbents of the type, $[M^{II}_{0.8}Mg_{2.2}Al(OH)_8](CO_3)_{0.5} \cdot xH_2O$ where some of the $Mg^{2+}$ sites in hydrotalcite are replaced by $M^{II}$ transition metal ions are described in this example.

The procedure for the preparation of LDH sorbent where $M^{II}$ is Co is described here. The preparation of other LDH sorbents with different $M^{II}$ ions were also carried out using a similar procedure. A solution containing 1.35 g $Co(NO_3)_2 \cdot 6H_2O$, 4.0 g $Mg(NO_3)_2 \cdot 6H_2O$, 2.66 g $Al(NO_3)_3 \cdot 9H_2O$ in 50 ml deionized water and a solution of 2.25 g NaOH and 0.75 g $Na_2CO_3$ (anhyd.) in 50 ml deionized water was added dropwise over a period of 45 min. to 50 ml deionized water. The pH of the reaction mixture was maintained between 10–11. The resulting pink slurry was stirred for another 18 h. at 60° C. The mixture was then cooled to room temperature, and the precipitate was separated by centrifugation. The solid was washed several times with deionized water until the washings were free of salts and then dried in air.

By using a similar procedure and corresponding $M^{II}$ nitrate salts, $Mg^{2+}$ in hydrotalcite was partially replaced by other $M^{II}$ ions such as $Cu^{2+}$, $Mn^{2+}$, $Co^{2+}$ and $Ni^{2+}$. The incorporation of $Mn^{II}$ was carried out under anerobic conditions to prevent oxidation of manganese hydroxide. The X-ray diffraction patterns of the dried solid samples corresponded to single phase layered structures with a basal spacings between 7.7–7.9 Å.

EXAMPLE 8

The LDH sorbents with the general formula $[Ca_6Al_{2-x}Fe_x(OH)_{16}](CO_3) \cdot yH_2O$ in which some or all of the octahedral aluminum are replaced by iron were prepared according to this example.

The procedure was analogous to Example 3, except that a solution containing $Ca(NO_3)_2 \cdot 4H_2O$, $Al(NO_3)_3 \cdot 9H_2O$ and $Fe(NO_3)_3 \cdot 9H_2O$ with different molar ratios, as given in Table 4, was added along with the solution containing NaOH and $Na_2CO_3$ to water at 65° C. The pH of the reaction mixture was maintained between 12-13. The X-ray powder diffraction patterns of the products corresponded to layered structures with basal spacings between 7.6-7.5 Å. Ca:Al:Fe ratios were determined by chemical analyses (cf., Table 4).

EXAMPLE 9

The preparation of mixed LDH sorbents with the general formulae $[Ca_6Fe_2(OH)_{16}](CO_3) \cdot yH_2O$ and $[Mg_6Fe_2(OH)_{16}](CO_3) \cdot zH_2O$ were prepared according to this example.

The procedure was analogous to Example 3, except that a solution containing 2.57 g $Mg(NO_3)_2 \cdot 6H_2O$, 2.36 g $Ca(NO_3)_2 \cdot 4H_2O$, and 2.70 g $Fe(NO_3)_3 \cdot 9H_2O$ was added dropwise, along with a solution containing 10 g NaOH and 0.25 g $Na_2CO_3$, to water at 65° C. while maintaining the pH of the reaction mixture between 12-12.5. The X-ray powder diffraction pattern of the product corresponded to the presence of two phases, with a basal spacings of 7.79 and 7.53 Å. These values suggested the phases in the products were $[Mg_6Fe_2(OH)_{16}](CO_3) \cdot zH_2O$ and $[Ca_6Fe_2(OH)_{16}](CO_3) \cdot yH_2O$.

EXAMPLE 10

This example describes the preparation of a $Mg_3Al$-LDH sorbent impregnated with iron as a $SO_2$ oxidation catalyst.

A one-gram portion of the sorbent prepared in accordance with Example 1 was impregnated with a solution of 0.15 g $Fe(NO_3)_3 \cdot 9H_2O$ in 10 ml water. The slurry was then dried in air. The amount of iron incorporated into this sample was $Fe_2O_3$ was 5.0%. An analogous procedure was used to incorporate 2.5% and 10.0% $Fe_2O_3$ into hydrotalcite.

EXAMPLE 11

This example describes the preparation of a $Mg_1Al$-LDH sorbent impregnated with vanadium as a $SO_2$ oxidation catalyst.

A 0.5 gram portion of the sorbent prepared in accordance with Example 1 was impregnated with a solution of 0.18 g $NH_4VO_3$ in 10 ml water. The slurry was then dried in air. The amount of iron incorporated into this sample as $V_2O_5$ was 5.0 wt. %.

EXAMPLE 12

This Example describes the preparation of a $Ca_3Al$-LDH sorbent impregnated with iron as a $SO_2$ oxidation catalyst.

A 0.1 g portion of the sorbent prepared in accordance with Example 3 was impregnated with a solution of 0.02 g $Fe(NO_3)_3 \cdot 9H_2O$ in 10 ml water. The slurry was then dried in air. The amount of iron incorporated into this sample as $Fe_2O_3$ was 5.0%.

EXAMPLE 13

The uptake of $SO_x$ by various LDH sorbents was determined by thermogravimetric analysis using a Cahn Model TG-121 thermogravimetric analyzer.

Approximately 50 mg of the sorbent was placed on a quartz pan in the thermogravimetric balance. Subsequent treatment of the sample was carried out in a three-step procedure:

Step 1: Under a flow of air as a carrier gas (200 ml/min), the sample was allowed to equilibrate at 25° C. for 15 min. and then slowly heated (5° C./min) to the calcining temperature, typically 700° C. for Mg containing sorbents and 800° C. for Ca containing sorbents. The sample was maintained at these temperature values for an additional 1 h.

Step 2: $SO_2$ gas (0.5%) was then introduced into the carrier gas at the reaction temperature and the weight was monitored for a 1 h period. For the more reactive sorbents a rapid initial weight uptake of $SO_x$ was observed, especially with sorbents containing iron. The weight increase corresponded to the amount of $SO_3$ absorbed by the calcined sample. (Table 2).

Step 3: Passage of $SO_2$ into the carrier gas was ceased and the sample weight at reaction temperature was monitored for another 1 h. This step was carried out in order to determine the thermal stability of the metal sulfate products formed after the reaction with $SO_x$. Almost all of the samples containing Mg/Al/Fe show little or no weight loss at 700° C., and Ca/Al/Fe samples showed little or no weight loss at 700° C. or 800° C.

EXAMPLE 14

Layered double hydroxides of the type $[Ca_3Al_{1-x}Fe_x(OH)_8](CO_3)_{0.5} \cdot xH_2O$ prepared according to the Examples 3 and 8, were tested for $SO_x$ uptake at 800° C. using the procedure given in Example 13.

A typical TG plot for the sample containing Ca:Al in the ratio 3:1 (x=0) is illustrated in FIG. 1. The amounts of $SO_x$ that reacted with the sorbent compositions are given in Table 4. LDH sorbents containing Fe show better initial $SO_x$ binding ability than LDH with no iron. Furthermore, LDH compositions with Ca/Al/Fe ratio between 3:0.4:0.6 and 3:0.2:0.8 showed excellent initial uptake and better overall uptake after exposing the calcined samples to $SO_2$ for 1 h. Preferred compositions contain 5% to 39% iron as $Fe_2O_3$, particularly 20-39% $Fe_2O_3$.

EXAMPLE 15

A layered double hydroxide of the type $[Ca_2Al(OH)_2](NO_3) \cdot xH_2O$ prepared according to Example 2, was tested for $SO_x$ uptake at 800° C. using the procedure given in Example 13.

This sorbent showed a weight uptake of 65.85% at 800° C. when exposed to $SO_2$ for 1 h. This value corresponded to 88% conversion of Ca sites to $CaSO_4$.

EXAMPLE 16

Layered double hydroxides of the type $[Mg_3Al_{1-x}Fe_x(OH)_8](CO_3)_{0.5} \cdot xH_2O$ prepared according to the Examples 1 and 4, were tested for $SO_x$ uptake at 700° C. using the procedure given in Example 13.

The amounts of $SO_x$ that reacted with the sorbent compositions are given in Table 2. LDH sorbents containing Fe show better $SO_x$ binding capacities than hydrotalcite containing no iron. Preferred compositions contain 5% to 39% iron as $Fe_2O_3$, particularly 20%-39% $Fe_2O_3$.

EXAMPLE 17

Layered double hydroxides of the type $[M^{II}_{0.8}Mg_{2.2}Al(OH)_8](CO_3)_{0.5} \cdot xH_2O$ prepared according to the Example 7, were tested for $SO_x$ uptake at 800° C. using the procedure given in Example 13.

The amount of $SO_x$ that reacted with the sorbent compositions are given in Table 3. LDH sorbents containing $M^{2+}$ transition metals as $SO_2$ oxidation catalysts show better $SO_x$ binding capacities than hydrotalcite with no $SO_2$ catalyst. In all these sorbents the initial weight uptake was rapid and the reaction with $SO_2$ was completed within the first 5 min. period during the 1 h. overall reaction time. The sorbent compositions that contained Mn, Co and Cu showed higher $SO_x$ uptakes.

EXAMPLE 18

Figure 2:
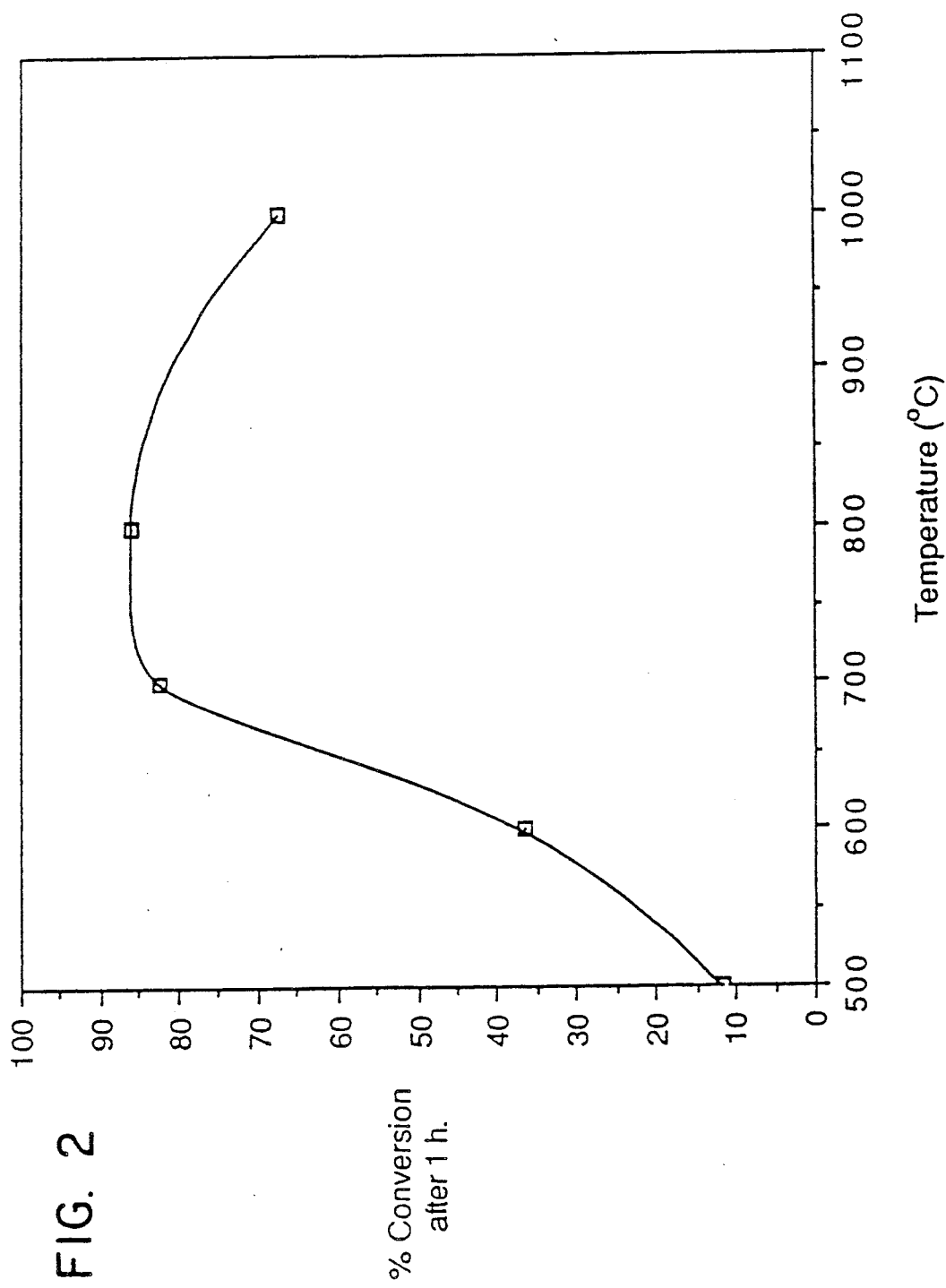
FIG. 2 is a graph showing the temperature dependence for $SO_2$ uptake by $[Mg_6Fe_2(OH)_{16}](CO_3).xH_2O$ as LDH.

A layered double hydroxide of the type $[Mg_6Fe_2(OH)_{16}](CO_3)\cdot xH_2O$ prepared according to Example 5 was tested for $SO_x$ uptake at different temperatures, using the procedure given in Example 13. The $SO_2$ concentration in the carrier gas was 0.5% v/v and the carrier gas was air. Substantial $SO_x$ absorption capacity was observed in the temperature range 600°–1000° C. Optimal reactivity occurred in the range 650°–800° C. (FIG. 2). Preferred calcining temperatures were between 500°–1000° C., more preferably, between 700°–900° C.

EXAMPLE 19

Figure 3:
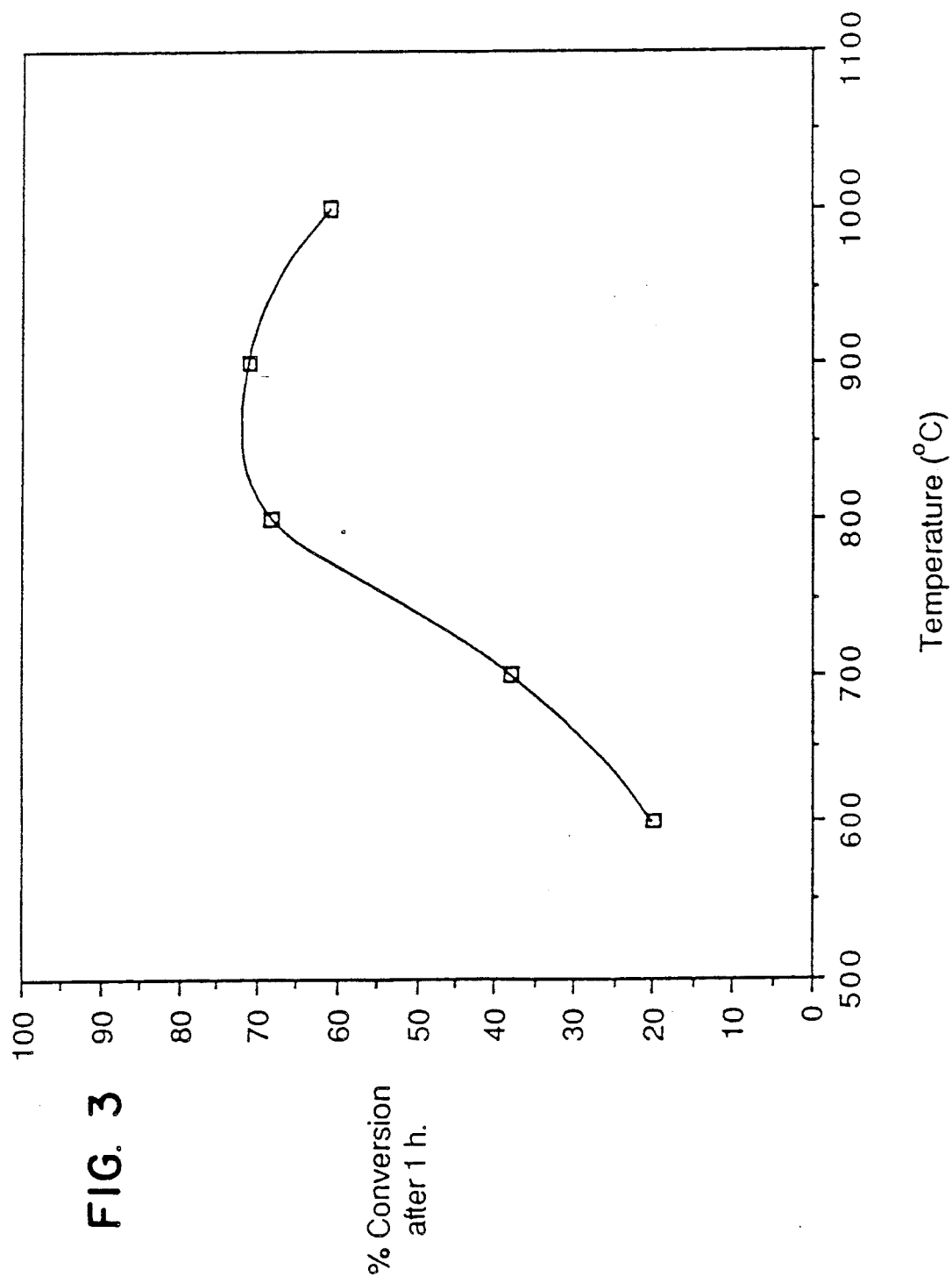
FIG. 3 is a graph showing the temperature dependence for $SO_2$ uptake by $[Ca_6Fe_2(OH)_{16}](CO_3).xH_2O$ as LDH.

A layered double hydroxide of the type $[Ca_6Fe_2(OH)_{16}](CO_3)\cdot xH_2O$ prepared according to the Example 8 was tested for $SO_x$ uptake at different temperatures, using the procedure given in Example 13. The $SO_2$ concentration in the carrier gas was 0.5% v/v and the carrier gas was air. Substantial increase of $SO_x$ absorption capacity was observed in the temperature range 800°–1000° C. Optimal reactivity occurred in the range 650°–800° C. (FIG. 3). Preferred calcining temperatures were between 800°–1000° C., more preferably, between 800°–900° C.

EXAMPLE 20

The LDH samples impregnated with $Fe(NO_3)_3$ and $NH_4VO_3$ solutions in Example 10, 11 and 12, were tested for $SO_x$ sorption according to Example 13 at 700° C. The results obtained for iron impregnated sorbents are given in Table 1. It is evident that hydrotalcite samples impregnated with iron containing solutions show better $SO_x$ binding ability, especially at the initial stages of reaction (see FIG. 5). Preferred LDH compositions contain 5.0%–10.0% $fe_2O_3$.

Similarly, hydrotalcite impregnated with $NH_4VO_3$ equivalent to 5% $V_2O_5$ resulted in improved $SO_x$ adsorption. The weight uptake observed was 46.7%, which corresponded to 35% conversion of Mg sites in hydrotalcite to $MgSO_4$.

EXAMPLE 21

The sorbent composition containing two layered double hydroxide phases of the type $[Ca_6Fe_2(OH)_{16}](CO_3)\cdot yH_2O$ and $[Mg_6Fe_2(OH)_{16}](CO_3)\cdot zH_2O$, prepared according to the Example 91, was tested for $SO_x$ uptake at a temperature of 800° C., using the procedure given in Example 13. The sorbent showed a 76.3% weight uptake at 800° C., which corresponded to a conversion of 71.2% of total Mg and Ca sites to sulfates.

EXAMPLE 22

A layered double hydroxide of the type $[Fe_6Al_2(OH)_{16}](CO_3)\cdot xH_2O$ prepared according to the Example 6, was tested for $SO_x$ uptake at 700° C., using the procedure given in Example 13. A weight uptake of 3.9% was observed in Step 2, which corresponded to a 10% conversion of Al sites to $Al(SO_4)_3$. The X-ray diffraction pattern of the final product after exposing to $SO_2$, showed peaks corresponding to $Al_2(SO_4)_3$. This $Al_2(SO_4)_3$ formed was found to be thermally unstable and thus underwent weight loss in Step 3.

EXAMPLE 23

The hydrotalcite-like sorbent prepared in Example 5 was tested for $SO_x$ sorption at different $SO_2$ concentrations using the procedure of Example 13 at 700° C. Results are given in Table 5. Reaction rates were higher when the $SO_2$ concentration was between 0.4%–0.6% v/v, preferably when the $SO_2$ concentration was 0.5%.

EXAMPLE 24

The Mg/Fe LDH sorbent prepared in Example 5 was ground and particles of different sizes were separated using particle testing screens. The $SO_x$ sorption of these different size of particles were tested using the procedure of Example 13 at 700° C. The results are given in Table 6. The $SO_2$ uptake was not influenced by the particle size, when particles were less than 50 mesh in size.

The test data presented above show that $SO_x$ uptake was consistently substantial for the LDH sorbents discussed and prepared according to this invention, particularly, when oxidation catalysts are incorporated into the LDH structure (FIGS. 4 and 5).

We claim:

1. A process for removing the $SO_x$ components from air in a flue gas stream containing oxygen, sulfur dioxide and sulfur trioxide from the combustion of coal within a coal fired boiler which comprises combusting the coal in the boiler to provide the flue gas stream and contacting the said flue gas stream with a heated sorbent composition at a temperature between about 400° and 1000° C. wherein the said sorbent before being heated was a layered double hydroxide structure of formula:

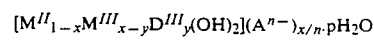

$$[M^{II}_{1-x}M^{III}_{x-y}D^{III}_y(OH)_2](A^{n-})_{x/n}\cdot pH_2O$$

wherein $M^{II}$ is a divalent metal cation, $M^{III}$ and $D^{III}$ are trivalent metal cations, A is a non-metallic interlayer anion of charge n—, x is between 0.8 and 0.12, and $0 < y \leq x$, wherein said $M^{II}$ and $M^{III}$ are selected from the group consisting of metal cations which form metal oxides and which are capable of reacting with $SO_2$ to form metal sulfites and with $SO_3$ to form metal sulfates, and $D^{III}$ is incorporated into the layers of the layered double hydroxide structure as a replacement for all or part of $M^{III}$ metal cations, and selected from the group consisting of transition metal cations which provide oxidation of sulfur dioxide to sulfur trioxide in an amount sufficient that said layered double hydroxide structure promotes the oxidation of the sulfur dioxide to sulfur trioxide at the combustion conditions within the coal-fired boiler wherein p is a positive number.

2. The process of claim 1 characterized in that, the $M^{II}$ is at least in part an alkaline earth metal cation.

3. The process of claim 1 wherein said $M^{II}$ is at least in part an alkaline earth metal cation selected from the group consisting of magnesium or calcium cations.

4. The process of claim 1 wherein said $M^{III}$ cation is at least in part selected from Group IIIA metal cations in the periodic table.

5. The process of claim 4 wherein said Group IIIA metal cation is an aluminum cation.

6. The process of claim 1 wherein the anion A is selected from the group consisting of inorganic anions that form volatile gases at elevated temperatures.

7. A process of claim 6 characterized in that the anion A is selected from the group consisting of $CO_3^{2-}$, $NO_3^-$, $SO_4^{2-}$, $Cl^-$ and $OH^-$ and mixtures thereof.

8. The process of claim 1 wherein the said metal cation $D^{III}$ is an iron cation.

9. A process for removing the $SO_x$ components from flue gas stream containing oxygen, sulfur dioxide and sulfur trioxide from the combustion of coal within a coal fired boiler which comprises combusting the coal in the boiler to provide the flue gas stream and contacting the said gas stream with a heated sorbent composition wherein the said sorbent before being heated has a layered double hydroxide structure of formula:

$$[M^{II}_{(1-x-z)}E^{II}_zM^{III}_x(OH)_2](A^{n-})_{x/n} \cdot pH_2O$$

wherein $M^{II}$ and $E^{II}$ are divalent metal cations, $M^{III}$ is a trivalent metal cation, A is an interlayer anion of charge $n-$, x is between 0.8 and 0.12, and $0 < z \leq (1-x)$ wherein p is a positive number wherein the layered double layered hydroxide provides oxidation of the sulfur dioxide to sulfur trioxide at the combustion conditions within the coal fired boiler.

10. The process of claim 9, wherein said $M^{II}$ and $M^{III}$ are selected from the group consisting of metal cations which form metal oxides and which are capable of reacting with $SO_2$ to form metal sulfites and $SO_3$ to form metal sulfates, and $E^{II}$ is incorporated into the layers of the layered double hydroxide structure as a replacement for all or part of $M^{II}$ metal cations, and selected from the group consisting of transition metal cations, which provide oxidation of sulfur dioxide to sulfur trioxide in an amount sufficient that said layered double hydroxide structure promotes the oxidation of the sulfur dioxide to the sulfur trioxide at the combustion conditions.

11. The process of claim 9 characterized in that the $M^{II}$ is at least in part an alkaline earth metal cation.

12. The process of claim 11 wherein said $M^{II}$ is at least in part an alkaline earth metal cation selected from the group consisting of magnesium or calcium cations.

13. The process of claim 9 wherein said $M^{III}$ cation is at least in part selected from Group IIIA metal cations in the periodic table.

14. The process of claim 13 wherein said metal cation is an aluminum cation.

15. The process of claim 9 wherein the anion A is selected from the group consisting of inorganic anions that form volatile gases at elevated temperatures.

16. A process of claim 15 characterized in that the anion A is selected form the group consisting of $CO_3^{2-}$, $NO_3^-$, $SO_4^{2-}$, $Cl^-$ and $OH^-$ and mixtures thereof.

17. The process of claim 9 wherein said metal cation $E^{II}$ is selected from the group consisting of iron, cobolt, manganese, nickel and copper cations.

18. A process for removing the $SO_x$ components from flue gas stream containing oxygen, sulfur dioxide and sulfur trioxide from the combustion of coal within a coal fired boiler which comprises combusting the coal in the boiler to provide the flue gas stream and contacting the said flue gas stream with a heated sorbent composition at a temperature between about 400° C. and 1000° C. wherein the said sorbent before being heated contains mixtures of two or more layered double hydroxide phases with the composition of each phase conforming to formula:

$$[M^{II}_{1-x}M^{III}_{x-y}D^{III}_y(OH)_2](A^{n-})_{x/n} \cdot pH_2O$$

wherein $M^{II}$ is a divalent metal cation, $M^{III}$ and $D^{III}$ are trivalent metal cations, A is a non-metallic interlayer anion of charge $n-$, x is between 0.8 and 0.12, and $0 < y \leq x$, wherein said $M^{II}$ and $M^{III}$ in mixed-phases are selected from the group consisting of metal cations which form metal oxides and which are capable of reacting with $SO_2$ to form metal sulfites and with $SO_3$ to form metal sulfates, and $D^{III}$ is incorporated into the layers of the layered double hydroxide structure as a replacement for all or part of the $M^{III}$ metal cations, and selected from the group consisting of metal cations which provide oxidation of sulfur dioxide to sulfur trioxide in an amount sufficient that said layered double hydroxide structure promotes the oxidation of the sulfur dioxide to the sulfur trioxide at the combustion conditions wherein p is a positive number.

19. The process of claim 18 characterized in that the $M^{II}$ cations in the mixed phases are at least in part alkaline earth metal cations.

20. The process of claim 19 wherein said $M^{II}$ cations are at least in part alkaline metal cations selected from the group consisting of magnesium or calcium cations.

21. The process of claim 18 wherein said $M^{III}$ cations in the mixed phases are at least in part selected from Group IIIA metal cations in the periodic table.

22. The process of claim 21 wherein said Group 13 metal cations are aluminum cations.

23. The process of claim 18 wherein the anions A are selected from the group consisting of inorganic anions that form volatile gases at elevated temperatures.

24. A process of claim 23 characterized in that the anions A in the mixed phases are selected from the group consisting of $CO_3^{2-}$, $NO_3^-$, $SO_4^{2-}$, $Cl^-$ and $OH^-$ and mixtures thereof.

25. The process of claim 18 wherein the said $D^{III}$ metal cations in mixed phases are selected from the group consisting of transition metal cations and mixtures thereof.

26. The process of claim 25 wherein the said metal cations $D^{III}$ are iron cations.

27. The processes of claim 1 wherein the sorbent has a particle size of less than 50 mesh (300 micrometers).

* * * * *

UNITED STATES PATENT AND TRADEMARK OFFICE
CERTIFICATE OF CORRECTION

PATENT NO. : 5,116,587

DATED : May 26, 1992

INVENTOR(S) : Thomas J. Pinnavaia, Jayantha Amarasekera and Christine A. Polansky It is certified that error appears in the above-identified patent and that said Letters Patent is hereby corrected as shown below:

Title page, in the Abstract, line 1, after "noxious", --sulfur-- should be inserted.

Column 1, line 36, "Process" should be --Processes--.

Column 3, line 7, after "brucite", --[Mg(OH)$_2$]-- should be inserted--.

Column 3, line 18, "hydrotalcite-like" should be --hydrotalcite--.

Column 3, line 35, "had" should be --hand--.

Column 4, line 21, "et. at." should be --et. al.--.

Column 5, line 64, "[Mg(OH)$_2$-like)]" should be --[Mg(OH)$_2$-like]--.

Column 5, line 67, delete "of" after "mixtures".

UNITED STATES PATENT AND TRADEMARK OFFICE
CERTIFICATE OF CORRECTION

PATENT NO. : 5,116,587

DATED : May 26, 1992

INVENTOR(S) : Thomas J. Pinnavaia, Jayantha Amarasekera and Christine A. Polansky It is certified that error appears in the above-identified patent and that said Letters Patent is hereby corrected as shown below:

Column 6, line 51, "x H$_2$)" should read --x H$_2$O--.

Column 6, line 64, after SO$_2$", --gas-- should be inserted.

Column 7, line 14, "A. Electrochem." should be --Z. Electrochem.--.

Column 7, lines 24 and 25, after "temperature.", delete "For the SO$_2$ sorbent, the first two steps occur at the reaction temperature."

Column 7, line 46, "of" should be --or--.

Column 8, line 34, "a" should be deleted after "in" and before "such".

Column 9, line 3, "ration" should be --ratio--.

Column 9, line 53, "[Mg$_{0.8}^{II}$" should be --[Mg$^{II}_{0.8}$--.

Column 12, line 29, "(MgOLFe$_2$O$_3$=3:1)" should be --(MgO:Fe$_2$O$_3$=3:1)--.

Column 12, line 51, "50%-λ%Al" should be --50%-80%Al--.

Column 12, line 52, "]lCO$_3$)", should be --]CO$_3$)--.

UNITED STATES PATENT AND TRADEMARK OFFICE
CERTIFICATE OF CORRECTION

PATENT NO. : 5,116,587

DATED : May 26, 1992

INVENTOR(S) : Thomas J. Pinnavaia, Jayantha Amarasekera and Christine A. Polansky It is certified that error appears in the above-identified patent and that said Letters Patent is hereby corrected as shown below:

Column 13, line 28, "$[Mg_gAl_2]$", should be --$[Mg_6Al_2]$--.

Column 13, line 35, "LDH (y=O) in Table 2)" should read --LDH (y=O in Table 2)--.

Column 13, line 44, "6=1.6" should be --y=1.6--.

Column 14, line 22, "form" should be --from--.

Column 15, line 48, "$AL_{2-4}$" should be --$Al_{2-4}$--.

Column 16, line 55, "Anerobic" should be --anaerobic--.

Column 17, line 38, "Mg,Al" should be --$Mg_3Al$--.

Column 19, line 41, "$fe_2O_3$" should be --$Fe_2O_3$--.

Column 19, line 50, "$[Ca_6Fe_2(OH)_{16})$" should be --$[Ca_6Fe_2(OH)_{16}]$--.

Column 19, line 52, "Example 91" should be --Example 9--.

Column 20 (Claim 1), line 33, "was" should be --has--.

UNITED STATES PATENT AND TRADEMARK OFFICE
CERTIFICATE OF CORRECTION

PATENT NO. : 5,116,587
DATED : May 26, 1992
INVENTOR(S) : Thomas J. Pinnavaia, Jayantha Amarasekera and Christine A. Polansky It is certified that error appears in the above-identified patent and that said Letters Patent is hereby corrected as shown below:

Column 21 (Claim 16), line 54, "form" should be --from--.

Column 21 (Claim 17), line 57, "cobolt" should be --cobalt--.

Signed and Sealed this

Thirtieth Day of November, 1993

Attest:

BRUCE LEHMAN

Attesting Officer

Commissioner of Patents and Trademarks